United States Patent Office 3,494,063
Patented Feb. 10, 1970

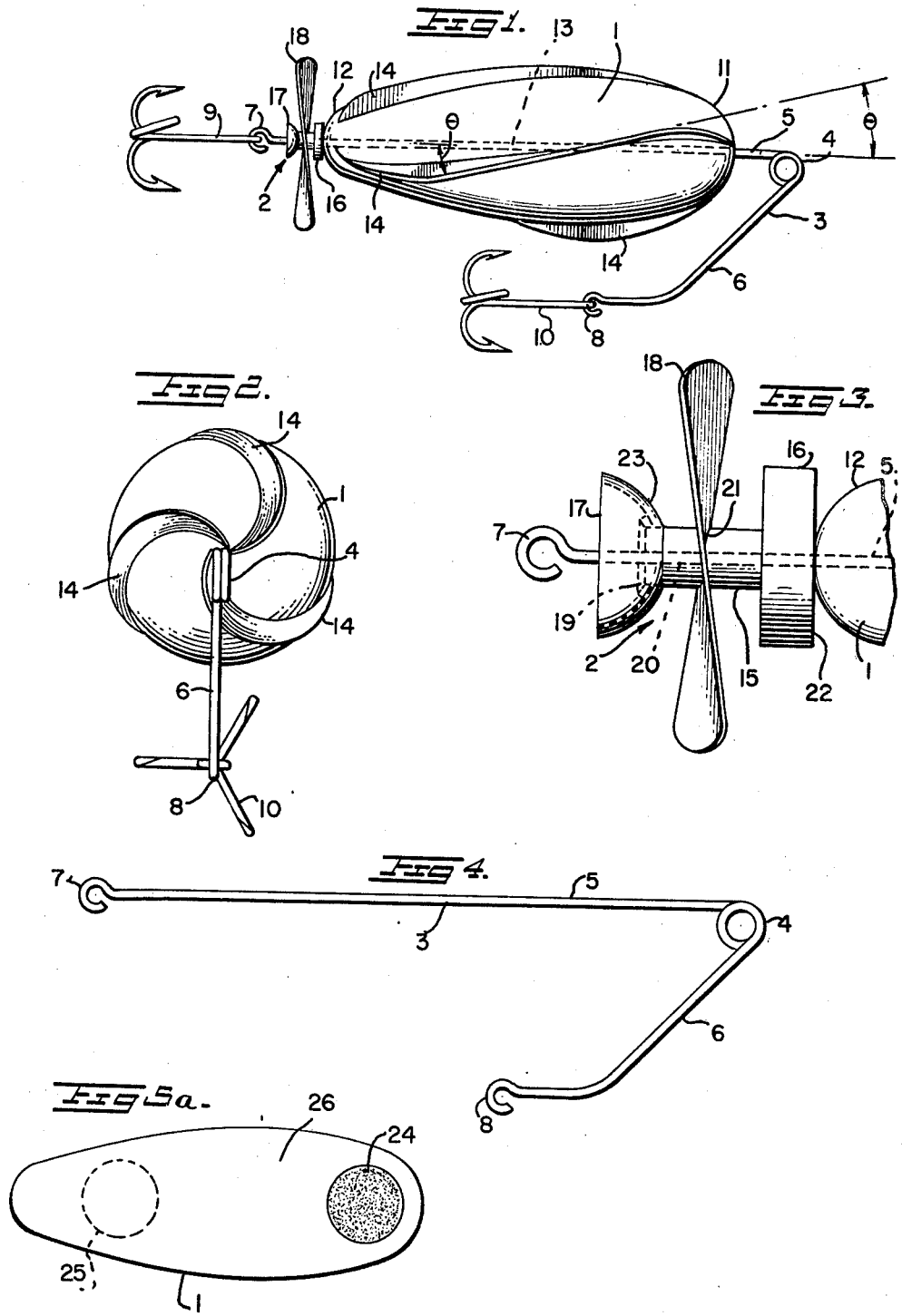

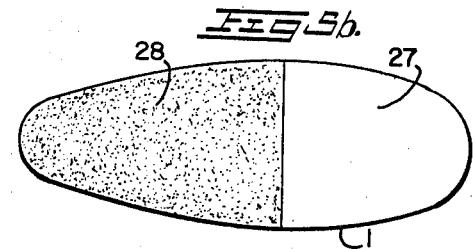
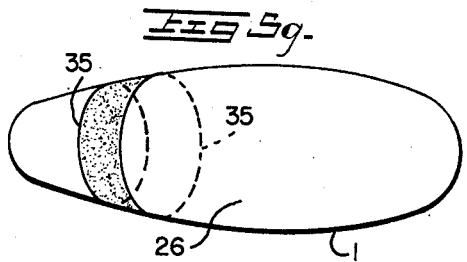
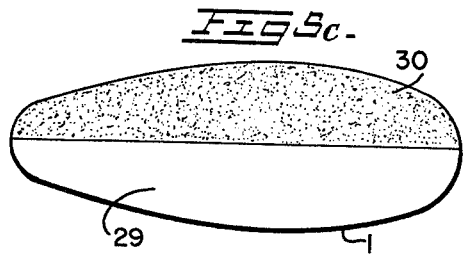
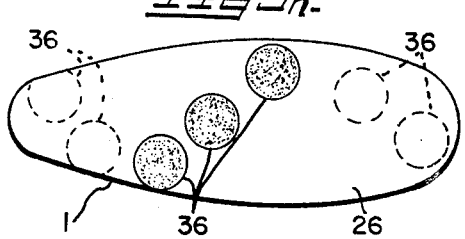
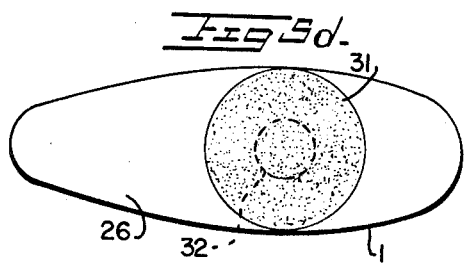
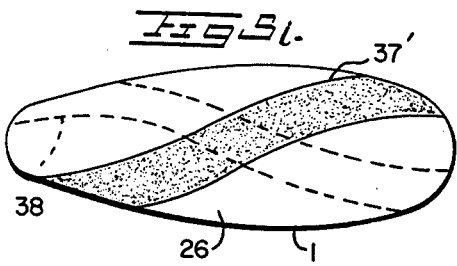
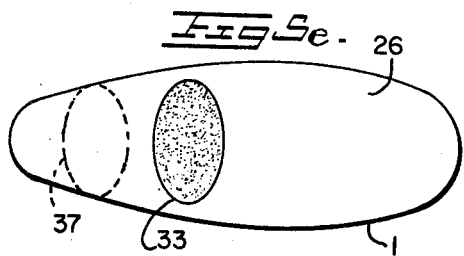
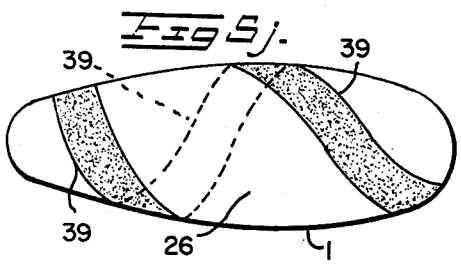
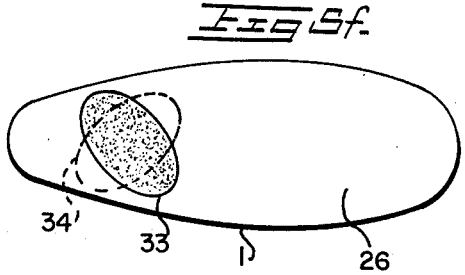
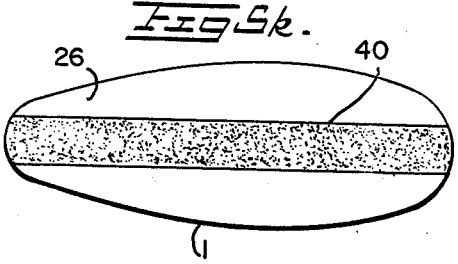

3,494,063
FISHING LURE
Mahlon L. Treaster, R.D. 2, Harpursville, N.Y. 13787
Filed June 23, 1965, Ser. No. 466,395
Int. Cl. A01k *91/00*
U.S. Cl. 43—42.14         14 Claims

ABSTRACT OF THE DISCLOSURE

A fishing lure having a rotatable plug body mounted on a non-rotating shaft, with indicia carried on said body to provide illusions of motion due to slow rotation of the body, with an independently rotatable propeller assembly carried on said shaft to rotate rapidly and independently of the plug body, and means for stabilizing the shaft against rotation, with one or more hooks attached to the shaft.

---

My invention relates to a fishing lure, and more particularly, to a lure adapted to attract fish by means of sound and movable, contrasting color designs.

It is one object of the present invention to provide a fishing lure including a rotatable lure body having various colored markings imprinted thereon, a rotatable sound producing propeller assembly and a spring holder for supporting the lure body, the propeller assembly and a pair of fish hooks.

A specific object of the present invention is to provide a fish lure wherein the lure body is provided with a plurality of blades adapted to slowly rotate the body as it is pulled through the water to insure the creation of a desired optical illusion.

Other objects and advantages of the present invention will appear from the following description taken in connection with the drawings, wherein:

FIG. 1 is a side elevational view of one preferred form of the lure of the present invention;

FIG. 2 is a front elevational view of the preferred form of lure of the present invention;

FIG. 3 is a detailed view of one form of sound-producing propeller assembly which may be used in connection with the present invention;

FIG. 4 is a side elevational view of a spring holder; and

FIGS. 5a through 5k show the lure body of the present invention with its blades removed and illustrate alternative color design variations which may be employed in the practice of the present invention.

Referring now to the drawings, and particularly to FIGS. 1 and 2, there is shown a fishing lure which includes a lure body 1, a sound producing propeller assembly, generally shown at 2, and a spring holder 3 which supports body 1 and assembly 2.

As shown in FIG. 4, spring holder 3 preferably may be formed from a single piece of rigid metal wire by twisting the wire to form a loop 4 and a pair of shaft portions 5 and 6. A fishing line or leader, not shown, is attached to loop 4. Shaft portions 5 and 6 are deformed adjacent their free ends to form loops 7 and 8 for supporting hooks 9 and 10, respectively. It will be appreciated that shaft portion 6 and accompanying hook 10 function as a keel to stabilize or prevent rotation of shaft portion 5 about which body 1 rotates, thereby minimizing twisting of the fishing line or leader during use of the lure. Also, loop 4 functions as a spring to prevent shaft 6 from being permanently bent out of position with respect to shaft 5 during use of the lure.

Referring particularly to FIGS. 1 and 2, lure body 1 is illustrated as being of streamline design having a relatively large, hemispherically-shaped front surface portion 11 and a relatively small, hemispherically-shaped rear surface portion 12. Body 1 may be fabricated from wood or hollow plastic, or solidly molded from any one of a number of light-weight plastic materials which will float in water. A typical plug body may be approximately 1½ to 3 inches in length and approximately one-half to three-quarters inches in diameter at its widest portion. Body 1 is provided with an axially extending bore 13 adapted to rotatably receive shaft portion 5 of holder 3. If desired, a thin washer (not shown) may be provided on shaft portion 5 between body portion 11 and loop 4 to prevent weeds and the like from entering axial bore 13 of body 1.

In order to cause rotation of body 1 with respect to shaft portion 5 as the same is drawn through or upon the surface of the water by a fishing line or leader (not shown), I provide a plurality of blades or fins 14 disposed on the surface of body 1. Body 1 and blades 14 may be formed of any suitable material, generally depending upon whether it is desired to employ the lure below or on the surface of the water.

Blades 14 are preferably spirally shaped and are located at equally spaced positions about the periphery of body 1 as illustrated in FIG. 2. I have found that if three blades are provided and that if a considerable portion of the length of each blade is disposed between 5–20 degrees with respect to the axis of body 1, and preferably approximately 7–13 degrees, there is obtained a relatively slow rotation of body 1, as it is drawn through the water at normal reeling speeds.

In FIG. 1 a blade 14 is shown established at an angle $\theta$ within the range of 5–20 degrees with respect to the axis of shaft portion 5, for much of the length of the plug body 1. In practice I prefer that the portion of each blade established at such an angle amount to at least one-third of the blade length. Such an arrangement provides the desired slow rotation of body 1.

This relatively slow rotation of body 1 permits me to obtain desired optical illusions of movement when employing the color designs illustrated in FIGS. 5a through 5k. It will be appreciated that if a body 1, having such color designs, experienced too rapid a rotation as it is drawn through the water at normal winding speeds, the designs would become blurred and the desired illusions lost.

While blades 14 are shown extending the entire length of body 1, it is within the scope of the invention to provide shorter blades. As one example, blades 14, 14 may be shortened and situated either at front portion 11 or rear portion 12 of body 1 and not extend along the entire length of body 1.

Referring particularly to FIGS. 1 and 3, there is shown the sound-producing propeller assembly 2 of the present invention. Assembly 2 includes a hollow shaft or sleeve 15 having an enlarged head portion 16, a dished out end plate 17 and a propeller blade 18. Plate 17 may be affixed to shaft 15 by outwardly deforming the end portion 19 of the shaft, as shown. Sleeve 15 is provided with a bore 20 to receive shaft portion 5 of wire member 3. Propeller 18 is provided with aperture 21 to permit relative rotation between propeller 18 and hollow shaft 15. If desired, shaft 15 may be permitted to rotate with respect to shaft portion 5. In operation the forwardly facing surface 22 of head portion 16 provides a bearing surface for the rear surface 12 of body 1, and the outwardly curved surface 23 of plate 17 forms a bearing surface for propeller 18. By this construction the sound-producing propeller 18 may rotate independently of lure body 1.

FIGS. 5a through 5k show lure body 1 with blades removed and illustrate alternative color designs which may be employed in the practice of this invention to create the optical illusion of movement. It will be appreciated that any desired dark and light colors may be employed to obtain a desired design. I have found, however, that by using red as the dark color and white as the light color a particularly desirable visual effect is achieved.

While certain designs are illustrated herein for drawing convenience as comprising dark marks on light backgrounds, it should be clearly understood that it is within the scope of the invention to utilize light marks on dark backgrounds.

FIG. 5a illustrates body 1 as having a pair of dark spots 24 and 25 disposed on a light background 26. As shown, spot 24 is placed on one side adjacent the front end of the body and spot 25 is placed on the opposite side adjacent the rear end of the body. While not shown, it will be apparent that spots 24 and 25 may be placed on the same side of body 1 and a third spot, may be placed on the opposite side of the body midway between spots 24 and 25. While shown round in FIG. 5a, it will be apparent that spots 24 and 25 may take various other shapes.

In FIG. 5b body 1 is provided on one side with a light forward half 27 and a dark rear half 28, respectively. On the other side, not shown, the colors are reversed. One alternative to this design would include dark rear and forward portions and a light intermediate portion on one side; the colors on the opposite side being reversed.

In FIG. 5c body 1 is divided color-wise longitudinally thereof; half of the body being light 29 and half dark 30. Alternatively, body 1 may be divided into any desired number of longitudinally-extending segments of alternating contrasting colors.

FIG. 5d shows body 1 as having a light background 26 and a pair of opposed dark spots 31 and 32 of different size.

In FIG. 5e body 1 has a light background 26 and a pair of axially-staggered bars or ovals 33 and 37 disposed on opposite sides of the body.

The design shown in FIG. 5f is similar to that of FIG. 5e except the bars or ovals 33 and 34 are tilted with respect to each other.

In FIG. 5g body 1 is provided with a light background 26 and a dark elliptically shaped line 35. Alternatively, line 35 may be a broken line or may be tilted with respect to the longitudinal axis of body 1.

In FIG. 5h body 1 is provided with a light background 26 and provided with a spiral design of dark dots or broken lines 36.

In FIG. 5i body 1 is provided with a light background 26 and dark stripes 37' and 38.

In FIG. 5j illustrated is body 1 having a light background 26 and a single dark line 39 in the form of a spiral.

FIG. 5k illustrates a body 1 having a light background 26 and a single dark band 40 which extends on opposite sides longitudinally of the body.

Although more than one form of the invention has been illustrated and described in detail, it will be apparent to those skilled in the art that various modifications may be made.

While FIGS. 5a through 5k show a number of alternative embodiments which incorporate single discrete color designs, it should be clearly understood that two or more of the design patterns suggested by the plural figures may be utilized on a single plug body without departing from the invention.

Having described my invention, what I claim as new and desire to secure by Letters Patent is:

1. A fish lure comprising a floatable body, a shaft for rotatably supporting said body, blade means attached to said body for effecting continuous rotation of said body in one angular direction around said shaft as the lure is drawn through the water, said body having indicia carried thereon including a first portion having a background color and a second portion of a contrasting color, the longitudinal position of said second portion varying in both rearward and forward directions around the periphery of said body, whereby said second portion appears to cyclically move rearwardly and forwardly relative to the said body as a whole as said body rotates.

2. The fish lure of claim 1 wherein said indicia includes a light background color and a pair of dark spots disposed on opposite sides of said body.

3. The fish lure of claim 2 wherein said spots have their centers aligned and are of different size, whereby rotation of said body creates the illusion of an expanding and shrinking spot.

4. The fish lure of claim 2 wherein one of said spots is disposed adjacent the forward end of said body and the other spot is disposed adjacent the rearward end of said body, whereby rotation of said body creates the illusion of a cyclic longitudinal change in spot position relative to said body as a whole as said body rotates.

5. The fish lure of claim 2 wherein the mid-points of said spots have the same longitudinal position and said spots extend in different directions, whereupon rotation of said body creates the optical illusion of a cyclic change in spot orientation without a change in the apparent longitudinal position of the spot mid-point as said body rotates.

6. The lure of claim 1 wherein said indicia includes a light background and a dark spot portion situated on one side of said body and extending less than 180 degrees around said body.

7. The fish lure of claim 1 wherein said indicia on said body includes a light background and a dark band which extends on opposite sides of said body longitudinally thereof.

8. The fish lure of claim 1 wherein said body is divided on one side into dark colored front and light colored rear portions, the colors on the opposite side of said body being reversed.

9. A fish lure comprising a body, a shaft for rotatably supporting said body, a plurality of blades carried on said body for effecting rotation of said body as the lure is drawn through the water, said blades being disposed at an angle between 5 and 20 degrees with respect to the axis of said body and each curving only a portion of the distance around said body, and means attached to said shaft for securing a fishing line, said body having dark and light colored indicia carried thereon with the longitudinal position of at least one of said indicia varying with the angular position about said body of said one of said indicia, whereby said indicia give the optical illusion of cyclic rearward and forward movement of one portion of said body relative to the body as a whole as said body rotates.

10. The fish lure of claim 9 wherein means are provided to stabilize said shaft as said lure is drawn through the water.

11. A fish lure comprising a body, a member having first and second shaft portions, said first shaft portion rotatably supporting said body, three curved blades carried on said body for effecting rotation thereof as the lure is drawn through the water, said blades being equally spaced about the surface of said body and disposed at an angle between 5 and 20 degrees with respect to the axis of said body, said second shaft portion of said member being connected to said first shaft portion of said member by resilient means and adapted to stablize said first shaft portion as said lure is drawn through the water, a sound-producing propeller assembly carried on said first shaft portion, said assembly forming separate bearing surfaces for a sound producing propeller and said body, and said body having dark and light colored indicia imprinted thereon, said indicia being shaped and positioned to give the optical illusion of movement as said body rotates.

12. A fish lure comprising a body, a first shaft, a second shaft, said shafts being joined for relative movement by a spring loop, said first shaft being adapted to rotatably supported said body and said second shaft being adapted to stabilize said first shaft as said lure is drawn through the water, a pair of fish hooks affixed one to each of the unattached ends of said first and second shafts, three curved blades carried on said body for effecting rotation thereof as the lure is drawn through the water, said blades being equally spaced about the surface of said body and disposed at an angle of 15° with respect to the axis of said body, said body having dark and light colored indicia thereon, said indicia giving the optical illusion of movement as said body rotates, and a sound producing propeller assembly carried on said first shaft, said assembly including a sound producing propeller, a propeller bearing shaft, said shaft having at one end thereof an enlarged portion adapted to form a bearing surface for said body, and an end plate affixed to the other end of said bearing shaft, said plate forming a bearing surface for said propeller.

13. A fish lure according to claim 1 wherein said body substantailly comprises a body of revolution presenting a substantially constant overall side profile as said body rotates.

14. The fish lure of claim 21 wherein said background color comprises a light color and said second portion of said indicia comprises a continuous dark stripe encircling said body in a plane tilted with respect to the axis of rotation of said body.

References Cited
UNITED STATES PATENTS

| | | | |
|---|---|---|---|
| 1,073,199 | 9/1913 | Wilt | 43—42.14 |
| 1,419,540 | 6/1922 | Brown | 43—42.39 |
| 2,306,692 | 12/1942 | Flood | 43—42.21 |
| 2,606,387 | 8/1952 | Garner | 43—42.2 |
| 2,885,818 | 5/1959 | Frederiksen | 43—42.19 X |

WARNER H. CAMP, Primary Examiner

U.S. Cl. X.R.

43—42.21, 42.31, 42.32